J. R. DONNELLY.
CEILING PLATE.
APPLICATION FILED JAN. 11, 1916.
1,230,385.
Patented June 19, 1917.
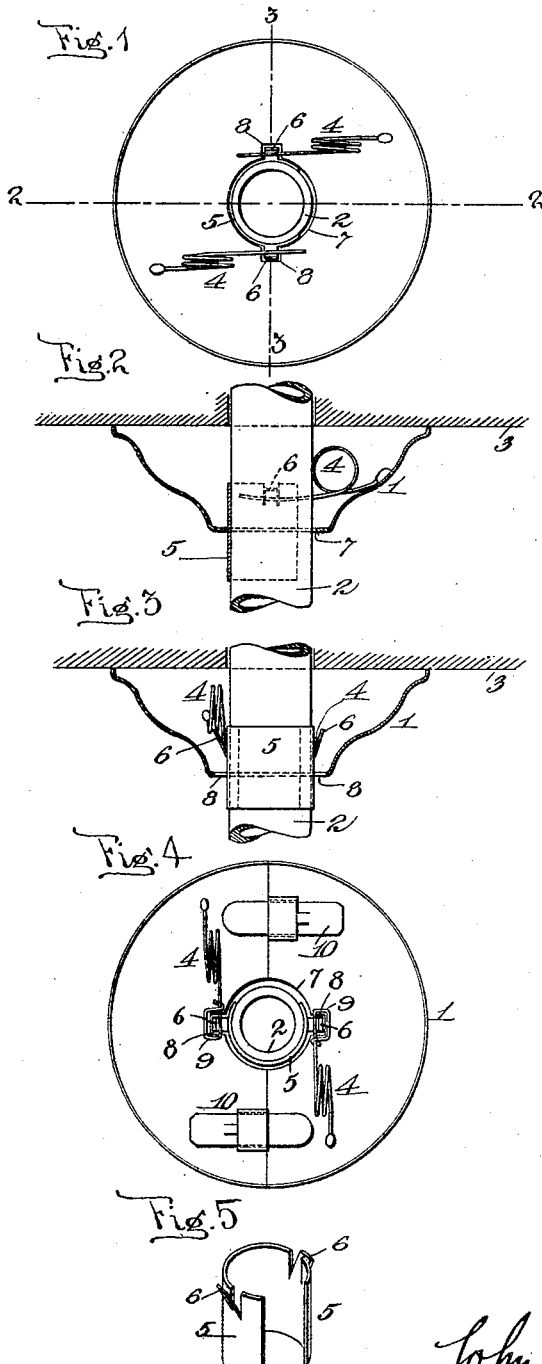

UNITED STATES PATENT OFFICE.

JOHN R. DONNELLY, OF AUSTIN, TEXAS.

CEILING-PLATE.

1,230,385.  Specification of Letters Patent.  Patented June 19, 1917.

Application filed January 11, 1916. Serial No. 71,402.

*To all whom it may concern:*

Be it known that I, JOHN R. DONNELLY, a citizen of the United States, and a resident of Austin, Travis county, Texas, have invented a certain new and useful Improvement in Ceiling-Plates, of which the following is a specification.

This invention relates to a ceiling plate specifically for use in connection with pipes which are subject to expansion or contraction, or both, and which pass through an opening in a fixed surface, such as a ceiling, and is a modification of the invention disclosed and claimed in my copending application for patent filed September 8, 1915, Serial No. 49,494.

The particular object of the invention is to support the ceiling plate in contact with the ceiling and hold it in contact therewith irrespective of the contraction or expansion, or both, of the pipe and at the same time to permit ready adjustment in position.

These and further objects will more fully appear from the following specification and accompanying drawings, considered together or separately.

In the drawings,

Figure 1 is a plan view of a ceiling plate embodying my invention;

Fig. 2 is a sectional view taken on the line 2—2 of Fig. 1;

Fig. 3 is a sectional view taken on the line 3—3 of Fig. 1;

Fig. 4 is a plan view of a modification; and

Fig. 5 is a perspective view of the clip illustrated in the preceding embodiments of the invention.

The improved ceiling plate 1 is of any suitable shape and configuration. It is adapted to surround and be supported upon a pipe 2, said pipe being subject to longitudinal expansion or contraction, or both. The plate is adapted to be forced into contact with a ceiling or other fixed surface 3. This is attained by means of a spring 4 or other yielding means. One end of the spring is attached to the ceiling plate and the other end engages with a clip 5, said clip carrying an ear 6 for engagement with the spring. The clip is preferably made of spring metal so that it is frictionally held in contact with the pipe and will remain in position. Preferably ears 6 are made integral with the clip as shown in Fig. 5. Preferably two springs, diametrically opposed, as shown in Fig. 1, are employed. With this construction the clip has two ears 6, 6 diametrically opposed. The ceiling plate is provided with a central opening 7, sufficiently large to make a loose fit with the pipe, and also surround the clip 5. This central opening is provided with a recess, or recesses, 8, 8, located in line with the clips 6, 6. It is understood that there are as many recesses as there are ears on the clip. The device may be assembled by putting the plate upon the pipe and adjusting the pipe in place. The plate may then be elevated to come into engagement with the ceiling and the clip 5 may then be put upon the pipe to surround the latter. This clip may then be elevated so that it will pass through the opening 7, the ears 6, 6 passing through the recesses 8, 8 until said ears come into contact with the free ends of the springs. The clip is elevated sufficiently far so that the springs are put under sufficient tension to always keep the plate in contact with the ceiling, irrespective of the contraction of the pipe. The springs are sufficiently flexible so that the pipe may expand or contract the maximum amount and at the same time snugly hold the plate in contact with the ceiling.

Fig. 4 is a modification of the invention in which the free ends of the springs are provided with loops 9, 9 which surround the ears 6 when in engagement therewith. In this embodiment of the invention the plate is made in two parts so that it may be assembled upon the pipe when the latter is in place. These two parts are secured together by suitable latches 10.

Having now described my invention, what I claim as new and desire to secure by Letters Patent, is:

1. The combination with a pipe which is subject to longitudinal expansion or contraction or both, and a fixed surface, of a plate surrounding the pipe, said plate having an opening for the passage of the pipe and a recess on the edge of the opening, a clip secured to the pipe and capable of longitudinal movement thereon, said clip having an ear adapted to pass through the recess, and a spring carried by the plate and adapted to engage with the ear.

2. The combination with a pipe which is subject to longitudinal expansion or contraction or both, and a fixed surface, of a plate surrounding the pipe, a clip frictionally engaging with the pipe, a plurality of ears on the clip, the said plate having a central opening surrounding the pipe, and a plurality of recesses communicating with said opening, said recesses being in line with the ears, and a plurality of springs carried by the plate and frictionally engaging with the ears.

3. The combination with a pipe which is subject to longitudinal expansion or contraction, and a fixed surface; of a plate surrounding the pipe, a clip engaging the pipe, ears on the clip, and a plurality of springs secured to the plate, a loop in each spring, said loops frictionally engaging the ears on the clip.

This specification signed and witnessed this 3rd day of January, 1916.

JOHN R. DONNELLY.

Witnesses:
JESSE H. BONEAR,
WALTER H. JOHNSON.